United States Patent [19]

Rinderer

[11] Patent Number: 5,782,439
[45] Date of Patent: *Jul. 21, 1998

[54] SUPPORT SYSTEM FOR TRANSMISSION LINES AND CABLE

[75] Inventor: Eric R. Rinderer, Highland, Ill.

[73] Assignee: Sigma-Aldrich Company, St. Louis, Mo.

[*] Notice: The term of this patent shall not extend beyond the expiration date of Pat. No. 5,628,481.

[21] Appl. No.: 563,676

[22] Filed: Nov. 28, 1995

[51] Int. Cl.$^6$ ............................................. H02B 3/00
[52] U.S. Cl. ........................... 248/49; 174/72 R; 248/58; 248/68.1
[58] Field of Search .................. 248/121, 385, 248/231.85, 292.13, 222.51, 340, 674, 49, 68.1, 58; 211/153; 403/170, 71, 174, 178, 217, 218; 174/72 R; 454/309

[56] References Cited

U.S. PATENT DOCUMENTS

| D. 190,608 | 6/1961 | Forrester | D80/8 |
|---|---|---|---|
| D. 228,737 | 10/1973 | Mathews | D8/8 |
| D. 261,960 | 11/1981 | Mathews | D6/114 |
| D. 308,628 | 6/1990 | Sorlien et al. | D8/356 |
| D. 317,112 | 5/1991 | Newuirth et al. | D8/356 |
| 317,154 | 5/1885 | Lowrie | 403/326 |
| D. 326,404 | 5/1992 | Spell | D8/356 |
| 429,421 | 6/1890 | Coit . | |
| 1,130,379 | 3/1915 | Collis . | |
| 1,200,474 | 10/1916 | Dunlap | 248/49 |
| 1,206,203 | 11/1916 | Brockway | 248/68 |
| 1,251,018 | 12/1917 | Hart | 454/309 X |
| 1,344,514 | 6/1920 | Lessells . | |
| 1,356,040 | 10/1920 | Caskey | 248/58 |
| 1,764,629 | 6/1930 | Houts et al. | 248/49 |
| 1,764,630 | 6/1930 | Houts | 248/49 |

(List continued on next page.)

FOREIGN PATENT DOCUMENTS

| 224731 | 12/1962 | Germany | 248/68.1 |
|---|---|---|---|
| 249494 | 11/1991 | Japan | 248/49 |
| 1580214 | 11/1980 | United Kingdom | 248/68.1 |

OTHER PUBLICATIONS

"A Revolutionary New System for Cable Trays", Ctlg. No. 166 Mono–Systems, Inc., Circa 1967, Jamaica, NY, pp. A1–17.
"Cable Trays", Ctlg. No. 289, Mono–Systems, Inc., undated, but admitted prior art, Jamaica, NY, pp. 2–19.
"Atlas Cable Tray", Atlas Cable Tray, Mar., 1992, Huntington, NY, pp. 1–14.
"Cable Tray Systems", B–Line systems, Inc., 1990, Highland, IL, 160 pages.
"Takes Your Cable Everywhere . . . ", Mono–Systems, Inc, Jericho NY, undated, but admitted prior art, unnumbered pages.
"An Application Manual on . . . Mono Cable Tray", Mono–Systems, Inc., Jericho, NY, undated, but admitted prior art, pp. 2–23.
Atlas Cable Tray Accessories & Fitting Brochure, dated Jun., 1993.
Undated Atlas Cable Tray Pivot Connector Brochure.
Undated Atlas Cable Tray Flo–Thru Tee Brochure.
"Cable Support Systems", Instructions for Engineering and Erection, Catalog, pp. 8 and 10, Bettermann, 1992.
"Swiftrack, Swifts", pp. 6, 16 and 21, Catalog, 1988.
Modern Hanger Corp. catalog, 1953, p. 88.

Primary Examiner—Ramon O. Ramirez
Assistant Examiner—Derek J. Berger
Attorney, Agent, or Firm—Senniger, Powers, Leavitt & Roedel

[57] ABSTRACT

A support system for data transmission lines and the like includes a plurality of rail sections and a hub having a horizontal peripheral rim. A plurality of vertical holes are spaced at intervals around the rim for connecting the rail sections to the hub in positions in which the rail sections radiate out from the hub.

19 Claims, 9 Drawing Sheets

U.S. PATENT DOCUMENTS

| | | | |
|---|---|---|---|
| 1,844,410 | 2/1932 | Schalk | 403/327 |
| 1,917,322 | 7/1933 | Peirce, Jr. | 248/68 |
| 2,026,312 | 12/1935 | Houts | 248/49 |
| 2,236,882 | 4/1941 | Vorkauf | 248/68.1 |
| 2,322,666 | 6/1943 | Schmitz | 248/68.1 |
| 2,473,388 | 6/1949 | Rambo | 287/103 |
| 2,656,998 | 10/1953 | Ullberg, Jr. | 248/68.1 |
| 2,874,923 | 2/1959 | Kaiser | 248/68.1 |
| 2,891,750 | 6/1959 | Bergguist | 248/58 |
| 2,899,159 | 8/1959 | LeBlang | 248/49 |
| 2,905,416 | 9/1959 | Wiegand | 248/58 |
| 2,917,259 | 12/1959 | Hill | 248/68.1 |
| 2,923,508 | 2/1960 | Daugherty | 248/58 |
| 2,939,664 | 6/1960 | Wesseler | 248/68.1 |
| 2,962,169 | 11/1960 | Landsman | 211/117 |
| 2,972,460 | 2/1961 | Kenyon | 248/62 |
| 3,022,030 | 2/1962 | Geer | 248/58 |
| 3,022,972 | 2/1962 | Bunston | 248/68.1 |
| 3,024,301 | 3/1962 | Walch | 174/72 |
| 3,034,753 | 5/1962 | Johnston et al. | 248/59 |
| 3,042,351 | 7/1962 | Du Bois | 248/49 |
| 3,076,865 | 2/1963 | Volk et al. | 174/146 |
| 3,091,658 | 5/1963 | Harmon | 248/61 X |
| 3,112,093 | 11/1963 | Madl, Jr. | 248/68.1 |
| 3,137,468 | 6/1964 | Meinders | 248/49 |
| 3,156,765 | 11/1964 | Weiss | 174/101 |
| 3,245,224 | 4/1966 | Wilkinson | 454/309 X |
| 3,363,048 | 1/1968 | Vaughn | 174/72 |
| 3,363,050 | 1/1968 | Martin | 174/101 |
| 3,429,535 | 2/1969 | Herzig | 248/58 |
| 3,443,782 | 5/1969 | Fields et al. | 248/188.7 |
| 3,521,843 | 7/1970 | Ogle | 248/58 |
| 3,563,882 | 2/1971 | Kimura et al. | 248/49 |
| 3,576,305 | 4/1971 | Welsh et al. | 248/68.1 |
| 3,598,349 | 8/1971 | Drake | 248/49 |
| 3,618,882 | 11/1971 | Podedworny | 248/68 R |
| 3,620,490 | 11/1971 | Roberts | 248/58 |
| 3,633,857 | 1/1972 | Logan | 248/62 |
| 3,680,817 | 8/1972 | Gogan | 248/68.1 |
| 3,713,613 | 1/1973 | Searls | 248/49 |
| 3,752,476 | 8/1973 | Mahoney | 273/1.5 |
| 3,785,598 | 1/1974 | Gillstrap | 248/58 |
| 3,787,016 | 1/1974 | Laval, Jr. | 248/49 |
| 3,787,018 | 1/1974 | Nathan | 248/165 |
| 3,791,613 | 2/1974 | Nollen | 248/49 |
| 3,851,378 | 12/1974 | Dessert | 29/523 |
| 3,870,260 | 3/1975 | Swart | 248/49 |
| 3,890,459 | 6/1975 | Caveney | 174/101 |
| 3,915,420 | 10/1975 | Norris | 248/58 |
| 3,923,277 | 12/1975 | Perrault et al. | 248/49 |
| 3,923,279 | 12/1975 | Gresley et al. | 248/318 |
| 3,936,024 | 2/1976 | Jung | 248/243 |
| 3,938,767 | 2/1976 | Norris | 248/58 |
| 3,948,473 | 4/1976 | Mason | 248/49 |
| 3,954,237 | 5/1976 | Harbarth et al. | 248/68.1 |
| 3,960,350 | 6/1976 | Tardoskegyi | 248/54 R |
| 3,996,102 | 12/1976 | Thome | 176/87 |
| 4,046,343 | 9/1977 | Kambara | 248/49 |
| 4,136,257 | 1/1979 | Taylor | 174/68 C |
| 4,214,723 | 7/1980 | Voorhees, Jr. | 248/68.1 |
| 4,232,845 | 11/1980 | Turner | 248/49 |
| 4,244,152 | 1/1981 | Harper, Jr. | 52/81 |
| 4,299,362 | 11/1981 | Buluschek et al. | 248/49 |
| 4,319,724 | 3/1982 | Bradbury | 248/49 |
| 4,330,221 | 5/1982 | Stumm | 403/218 |
| 4,347,998 | 9/1982 | Loree | 248/68.1 |
| 4,366,939 | 1/1983 | McMillan | 248/68.1 |
| 4,372,510 | 2/1983 | Skypala | 248/58 |
| 4,391,426 | 7/1983 | Göthberg | 248/49 |
| 4,429,797 | 2/1984 | Collins | 211/119 |
| 4,432,519 | 2/1984 | Wright | 248/49 |
| 4,442,989 | 4/1984 | Hartmann | 248/49 |
| 4,570,437 | 2/1986 | Moritz | 59/78.1 |
| 4,687,076 | 8/1987 | Tu | 182/178 |
| 4,709,888 | 12/1987 | Cubit et al. | 248/73 |
| 4,765,576 | 8/1988 | Peled | 248/49 |
| 4,790,500 | 12/1988 | Mori | 248/49 |
| 4,802,643 | 2/1989 | Uys | 248/49 |
| 4,845,316 | 7/1989 | Kaercher | 174/135 |
| 4,960,253 | 10/1990 | Perrault et al. | 248/68.1 |
| 5,004,192 | 4/1991 | Handler | 248/49 |
| 5,040,635 | 8/1991 | Strickland | 182/100 |
| 5,042,756 | 8/1991 | Pratt, Jr. | 248/49 |
| 5,062,605 | 11/1991 | Muhlethaler | 248/68.1 |
| 5,083,883 | 1/1992 | Ueda et al. | 403/328 |
| 5,085,384 | 2/1992 | Kasubke | 248/62 |
| 5,092,546 | 3/1992 | Wolfbauer | 248/49 |
| 5,100,086 | 3/1992 | Rinderer | 248/49 |
| 5,123,618 | 6/1992 | Guterman et al. | 248/49 |
| 5,127,759 | 7/1992 | Orbom | 403/171 |
| 5,169,099 | 12/1992 | Yang | 248/49 |
| 5,230,302 | 7/1993 | Steudler, Jr. | 248/58 X |
| 5,320,439 | 6/1994 | Perrault et al. | 403/379 |
| 5,323,988 | 6/1994 | Handler | 248/49 |
| 5,564,658 | 10/1996 | Rinderer | 248/58 |
| 5,618,014 | 4/1997 | Rinderer | 248/58 |
| 5,628,481 | 5/1997 | Rinderer | 248/58 |

SUPPORT SYSTEM FOR TRANSMISSION LINES AND CABLE

BACKGROUND OF THE INVENTION

This invention relates generally to cable tray systems used to support electrical wiring, cables and conduit, and more particularly to a hub for connecting sections of cable tray.

This invention is especially (but not exclusively) directed to cable tray systems of the type described in co-assigned U.S. Pat. No. 5,564,658, issued Oct. 15, 1996, which describes a lightweight cable tray system adapted for carrying data transmission lines and the like.

Generally, sections of cable tray are connected together by splice members, each of which connects two sections end to end. Splice members are also available to connect cable tray sections perpendicular to one another (e.g., X or T configuration), or at an angle to one another (e.g., Y configuration). A number of different types of splice members are required to provide for various configurations since a single type of splice member cannot create multiple configurations (Y's, T's, crosses, etc.). Furthermore, these splice members are typically inserted into an open end of a rail section, thus requiring different splice members for different width trays. A large number of splice members must therefore be kept in stock.

Accordingly, there is presently a need for a support system which is capable of connecting a plurality of rail sections in virtually any configuration.

SUMMARY OF THE INVENTION

Among the several objects of this invention may be noted the provision of an improved support system which is capable of connecting a plurality of rail sections in different configurations; the provision of a support system which has a hub capable of connecting rail sections of different cross sections; the provision of a support system which has a junction area unobstructed by a central structural member; the provision of a support system which is especially suited for supporting data transmission lines and the like; the provision of a support system which is lightweight and relatively inexpensive; the provision of a support system which has a minimum number of loose parts; and the provision of such a system which permits ready routing of data transmission lines.

In general, a support system of this invention comprises a plurality of rail sections and a hub having a horizontal peripheral rim around the hub. The support system further comprises a plurality of vertical holes in the rim at intervals spaced around the rim for connecting the rail sections to the hub in positions in which the rail sections radiate out from the hub.

Other objects and features will be in part apparent and in part pointed out hereinafter.

BRIEF DESCRIPTION OF THE DRAWINGS

FIG. 1 is a top elevation of a support system of the present invention carrying data transmission lines and the like;

Corresponding parts are designated by corresponding reference numerals in the several views of the drawings.

DESCRIPTION OF PREFERRED EMBODIMENTS

Figure 1:
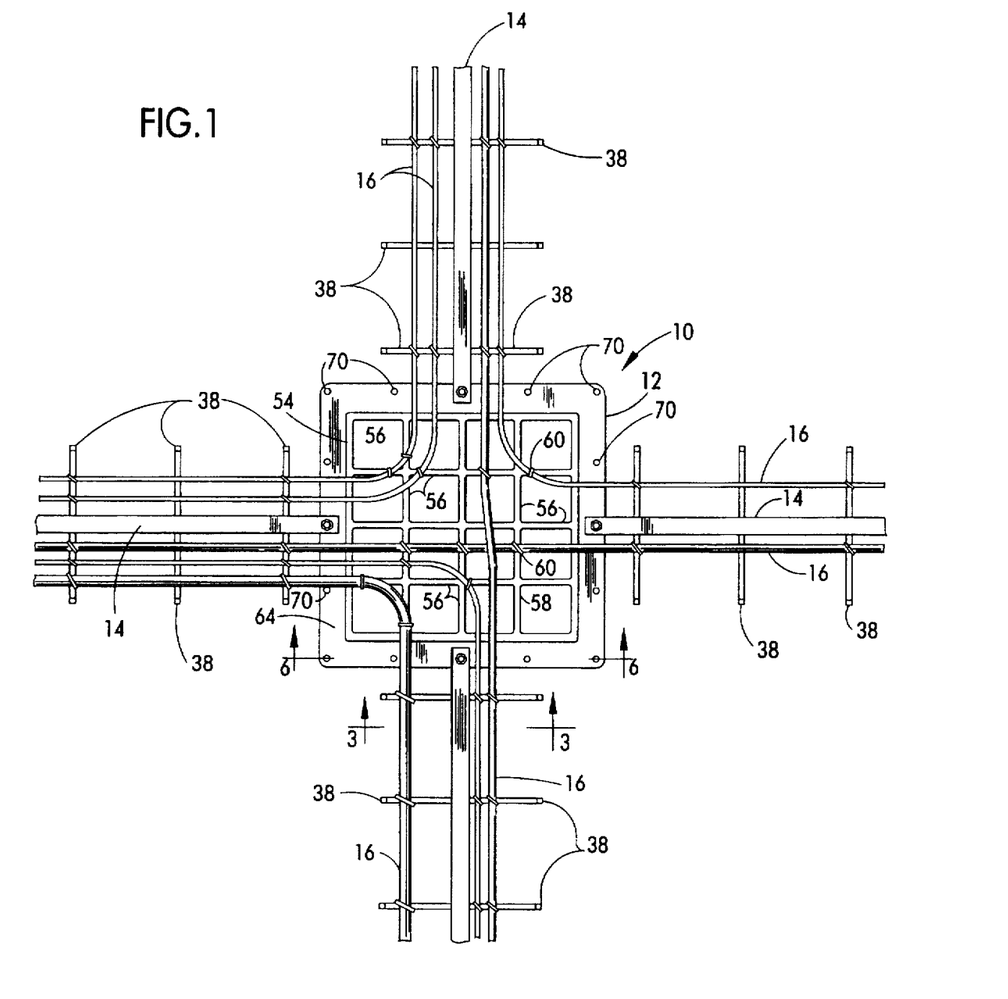

Referring now to the drawings, and first to FIG. 1, a support system is generally indicated at 10 for supporting cable, transmission lines and the like, each designated 16. The support system 10 comprises a hub generally designated 12, and a plurality of rail sections connected to the hub, each such rail section being generally designated 14. The hub 12 is provided as a junction for connecting rail sections 14 approaching the hub from different directions. Cable 16 may be routed from one rail section 14 across the hub 12 in a generally straight path to a rail section extending from an opposite side of the hub, or the cable may be redirected and routed to a rail connected to an adjacent side of the hub.

Figure 3:
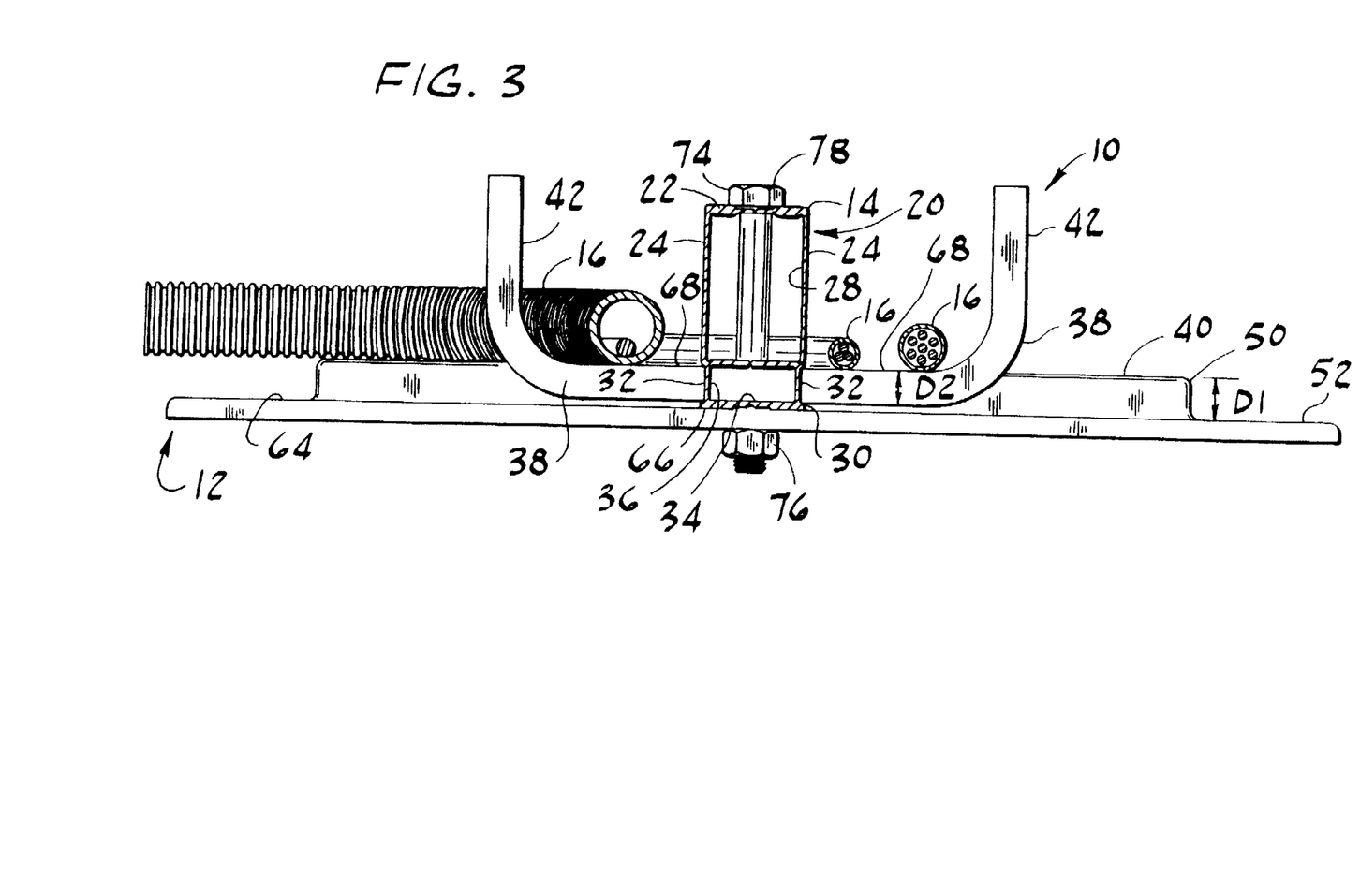
FIG. 3 is a cross-sectional view of the support system taken in the plane including line 3—3 of FIG. 1.

As shown best in FIG. 3, a typical rail section 14 has an upper box beam portion, generally indicated at 20, comprising a top wall 22, opposite side walls, each designated 24, and a bottom wall 26, all of which combine to define an upper interior space indicated at 28. The rail section 14 is also formed to have a lower portion 30 comprising a pair of generally parallel, spaced apart side walls, each designated 32, extending down from the bottom wall 26 of the upper box beam portion 20, and a lower wall 34 spaced below the bottom wall 26 of the upper box beam portion 20. The lower portion 30 of the rail section 14 defines a lower interior space 36. Each rail section 14 has a series of rungs 38 extending laterally out from the lower portion 30 of the rail section for supporting cable, data transmission lines and the like, at an elevation generally the same as an upper surface 40 of the hub 12. Each rung 38 preferably has an upwardly bent outer end 42 to prevent the cable 16 from sliding off the rung. Preferably, the rungs 38 extend out from lower portions 30 of the rail sections 14 to keep the overall height of the rail sections to a minimum. The rail sections 14 may have other configurations, including those discussed in U.S. Pat. No. 5,564,658. For example, each rail section may have a plurality of supports (not shown) extending down from the rail section and having a series of arms extending laterally outwardly from the support for supporting a series of horizontal runs of data transmission lines and the like at different elevations.

Figure 2:
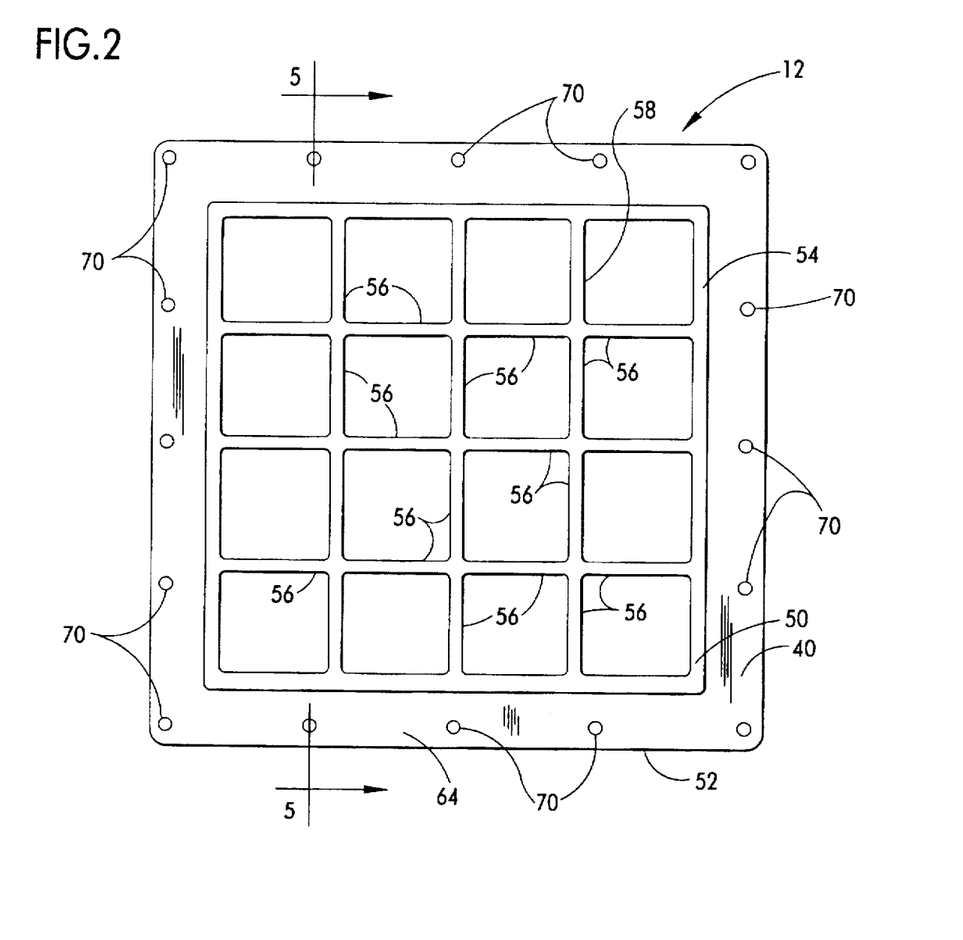
FIG. 2. is a top elevation of a hub of the support system of FIG. 1.
Figure 5:
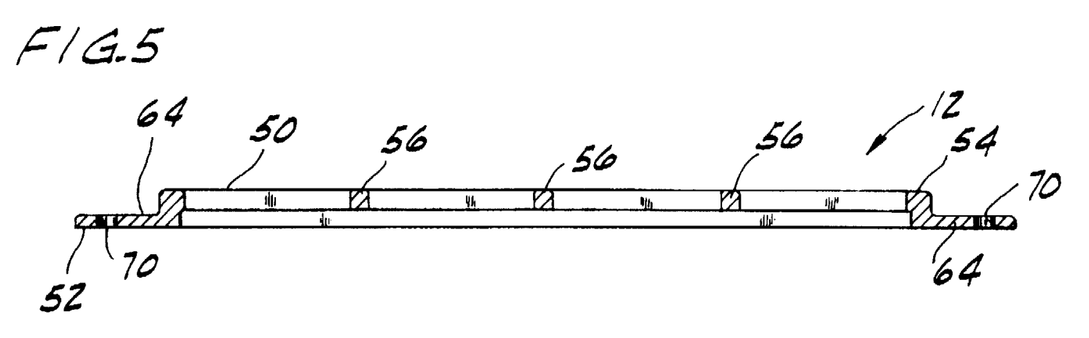
FIG. 5 is a cross-sectional view of the hub taken in the plane including line 5—5 of FIG. 2.

The hub 12 comprises a hub member 50 and a peripheral outer border or rim 52 disposed in a generally horizontal plane around the hub member. The hub member 50 and rim 52 are generally rectangular, each having four sides and four corners. It is to be understood that the hub member 50 and rim 52 may be in the form of a circle or have other shapes without departing from the scope of the invention. The hub member 50 is preferably flat and relatively thin, having a maximum thickness substantially less than the overall height of the rail sections 14. For example, the thickness of the hub member 50 may be 0.125 inches. It is to be understood that the thickness may vary depending on the size of the hub 12. As shown in FIGS. 2 and 5, the hub member 50 includes an outer frame 54 and a plurality of ribs 56 extending between at least two sides of the frame. A single rib 56 may be used or a number of ribs may be used to form a grid 58 as shown in FIGS. 1 and 2. The grid 58 is located within and connected to the four sides of the frame 54 of the hub member 50. The ribs 56 may be integrally formed with the outer frame 54 or may be formed separately and attached by any suitable means. As shown in FIG. 1, ties 60 may be wrapped around the ribs 56 and cable 16 to hold the cable in place. The ties 60 may be used to secure cable 16 running directly across the hub 12, or may be used to position the cable to form an angle for changing direction of the routing of the cable. The tie 60 may be any commercially available tie, such as a stainless steel or nylon cable tie. The ends of the tie 60 may be crimped in place or secured by any other means that will prevent the tie from loosening over time. For applications in which the cables 16 do not have to be tied down, the hub member 50 may be in the form of a solid sheet or may comprise only an outer frame 54 with no ribs 56.

Figure 4:
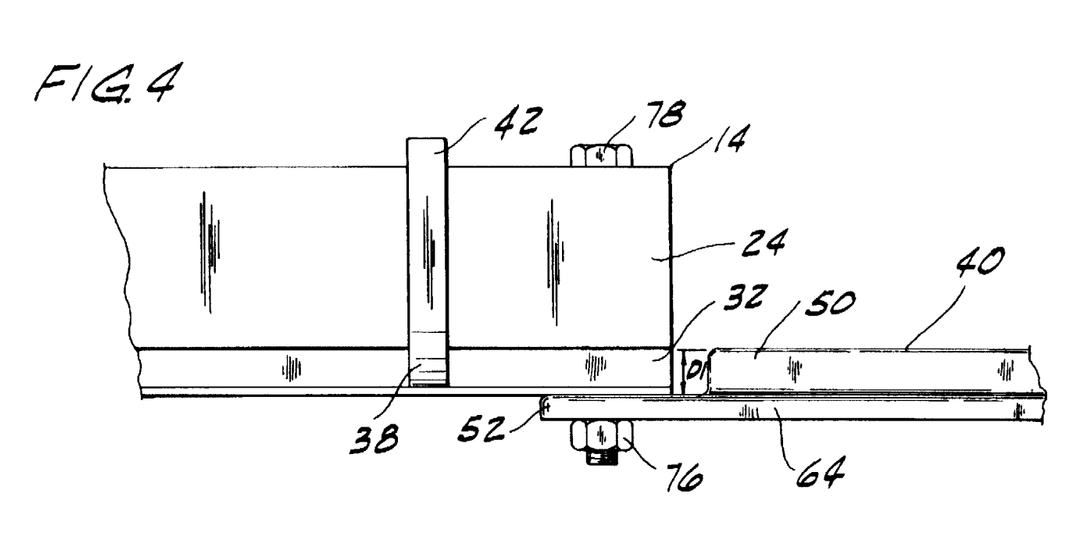
FIG. 4 is a partial side elevation of the support system of FIG. 1.

The peripheral rim 52 comprises a flange structure in the form of an annular flange 64 extending horizontally outwardly from the hub member 50. The flange 64 is downwardly offset with respect to the upper surface 40 of the hub 12 a distance D1 approximately equal to the distance D2 from a bottom surface 66 of the rail section 14 to a transmission line supporting surface 68 on each rung 38 extending laterally out from the rail section for carrying the transmission lines 16 (FIGS. 3 and 4). The height D1 may vary to correspond to the height D2 so that the line supporting surface 68 of the rung 38 is generally coplanar with the upper surface 40 of the hub member 50, thus providing a continuous, generally flat surface for the transmission lines 16 to be routed over. It is to be understood that the rim 52 may extend only from one, two or three sides of the hub member 50 without departing from the scope of this invention.

The rim 52 has a plurality of vertical holes 70 at intervals spaced around the rim for connecting the rail sections 14 to the hub 12 in positions in which the rail sections extend laterally out from the hub. The holes 70 may be located at each corner and along the sides of the rim 52. The number and location of holes 70 may vary as needed. The hub member 50 and peripheral rim 52 may be stamped as an integral piece from sheet metal (e.g., 12-gage sheet metal), cast as an integral piece or formed by other means or from other suitable material. The peripheral rim 52 may also be formed separate from the hub member 50 and attached to the hub member by suitable means such as welding.

Figure 6:
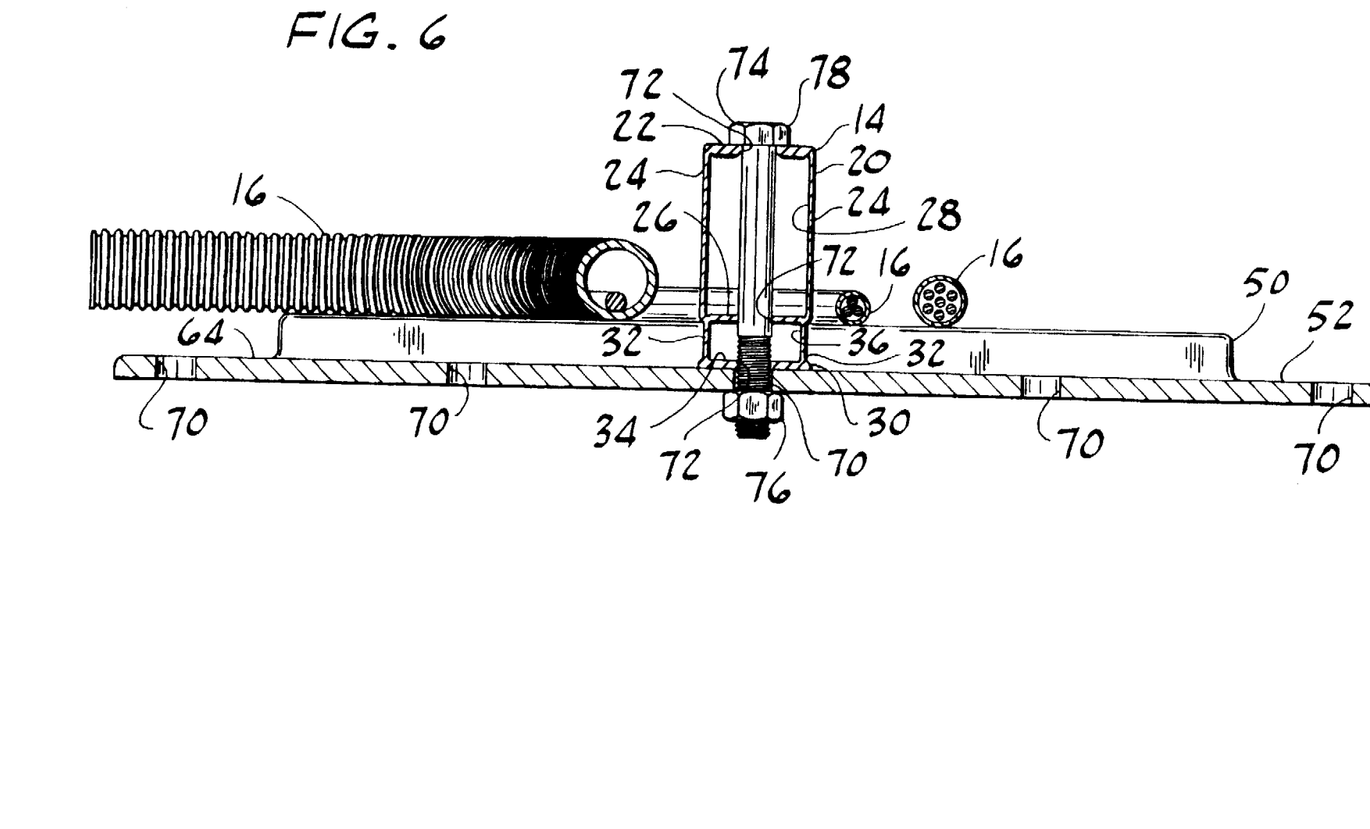
FIG. 6. is a cross-sectional view of the support system taken in the plane including line 6—6 of FIG. 1.

Each rail section 14 has holes 72 in the top and bottom walls 22, 26 of the upper box beam portion 20 and in the lower wall 34 of the lower box portion 30 of the rail section (FIG. 6). These holes 72 are vertically aligned to receive a connector 74 which extends vertically through a corresponding vertical hole 70 in the rim 52 for connecting the rail section 14 to the hub 12. The connector 74 may comprise a nut 76 and bolt 78 or any other suitable attachment means.

Figure 8:
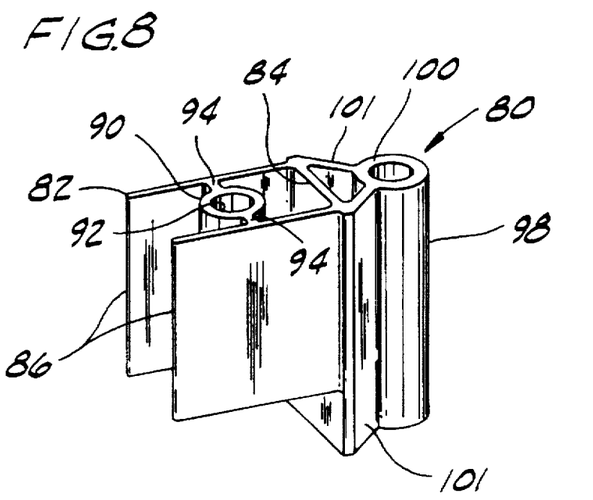
FIG. 8 is a perspective view of a splice member for connecting a rail section to the hub of FIG. 2.
Figure 9:
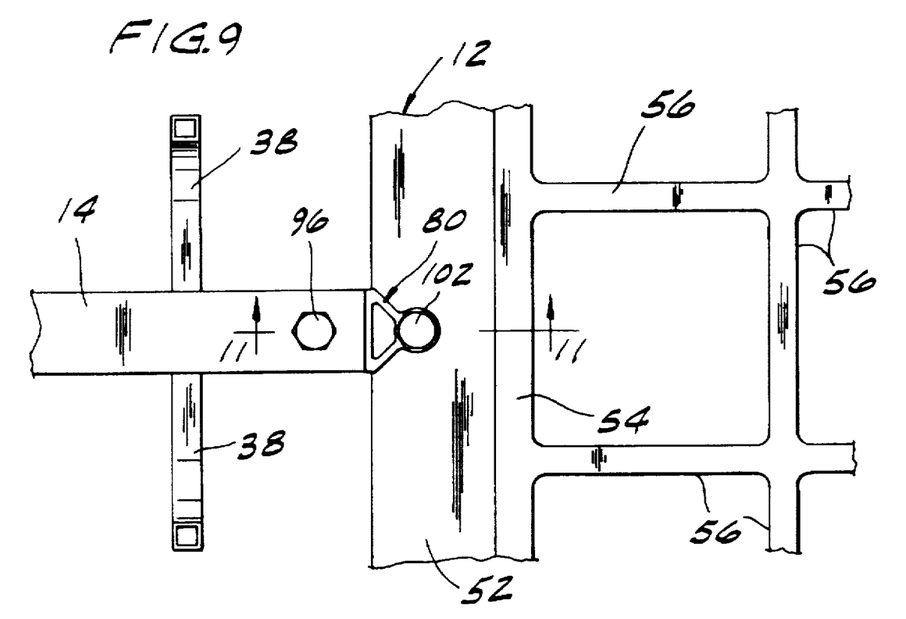
FIG. 9 is a top elevation of a rail section connected to the hub by the splice member of FIG. 8.
Figure 10:
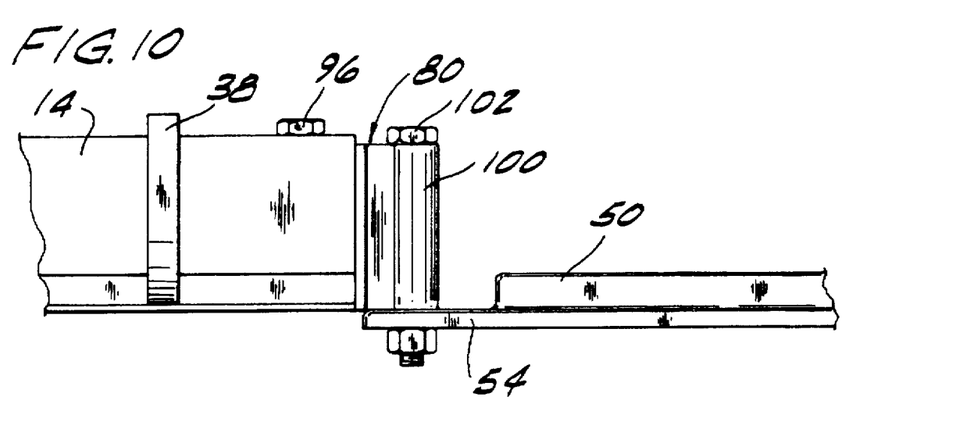
FIG. 10 is a partial side elevation of the rail section connected to the hub by the splice member of FIG. 8.
Figure 11:
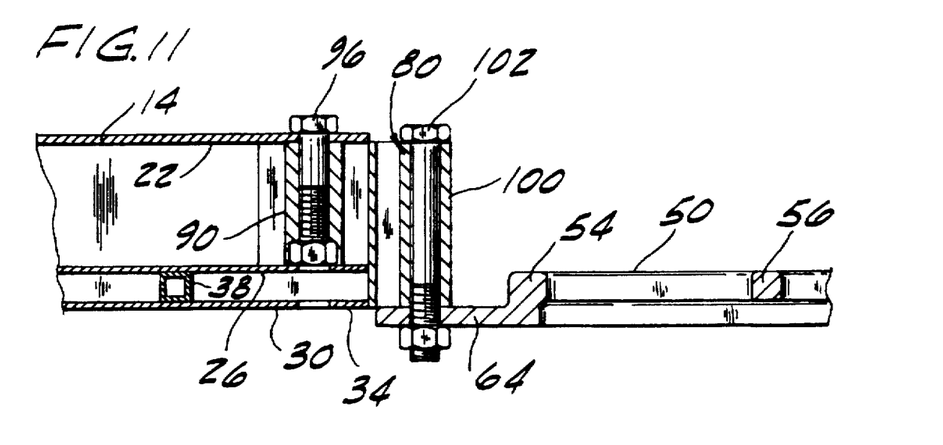
FIG. 11 is a cross-sectional view of the hub, rail section and splice member taken in the plane including line 11—11 of FIG. 9.

The connector 74 allows for pivoting of the rail section 14 relative to the hub 12 about the vertical axis of the connector. This permits two rail sections 14 connected by the hub 12 to pivot relative to one another in a generally horizontal plane. The rail sections 14 may also be connected to the hub 12 with a splice member of the type disclosed in U.S. Pat. No. 5,564,658 and shown in FIGS. 8–10. The splice member, generally designated 80, has a first portion 82 comprising an end wall 84, two generally parallel side walls 86, extending from the end wall, and a sleeve 90 defining a vertical bore 92 centrally supported between the side walls by a pair of webs 94. The side walls 86 are spaced apart a distance only slightly less than the distance between the side walls 24 of a rail section 14 being connected to the hub 12, and the overall height of the first portion is only slightly less than that of the upper interior space 28 of the rail section between its top wall 22 and bottom wall 26. The design is such that the first portion 82 is sized for a relatively snug fit inside the upper interior space 28 of the rail section 14. The first portion 82 is designed to be inserted into the rail section 14 to a position in which the bore 92 defined by the vertical sleeve 90 is vertically aligned with vertical holes 72 in the rail section so that a fastener, such as a bolt 96 may be inserted to secure the rail section to the splice member 80. The splice member 80 further includes a second portion 98 comprising a vertical sleeve 100 attached to the first portion by a pair of connecting webs 101. The second portion 98 is releasably connected to the hub 12 by a bolt 102 or any other suitable attachment means passing through the vertical sleeve 100 down through the hole 70 in the rim 52.

Figure 7:
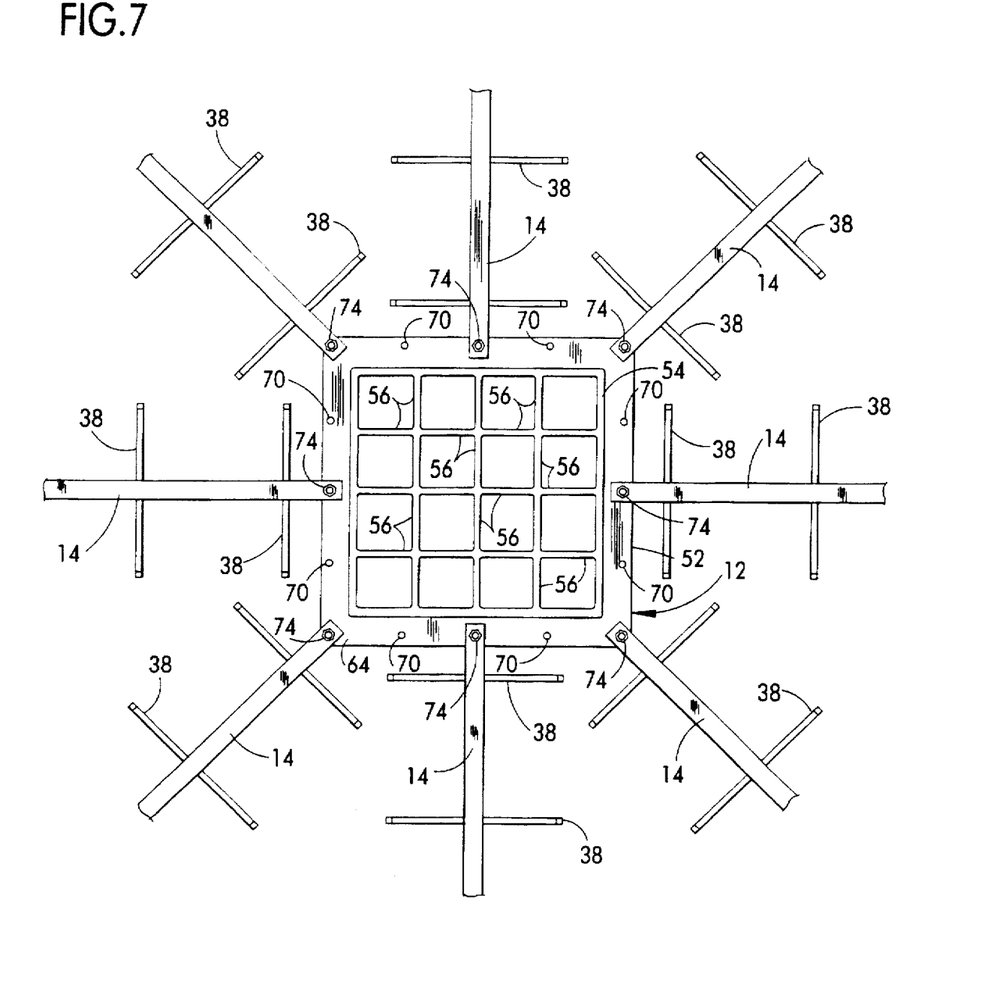
FIG. 7 is a top elevation of the support system of the present invention showing various configurations of rail sections and hub connections.
Figure 12A:
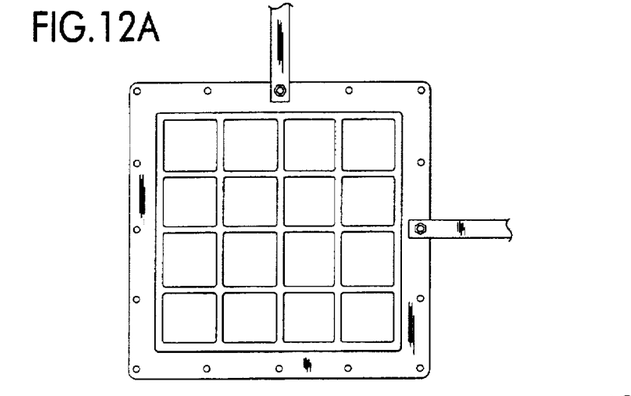
FIG. 12A is a top elevation of the support system showing the hub and two rails in an L-shaped formation.
Figure 12B:
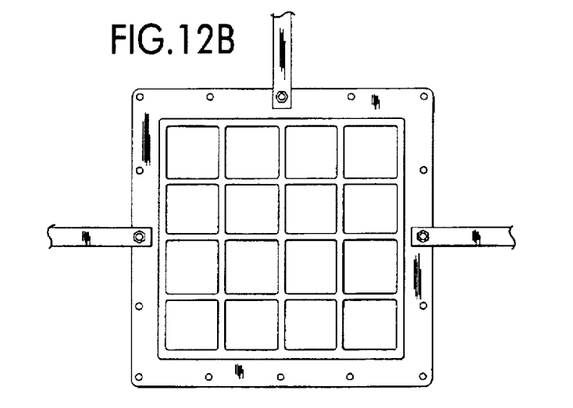
FIG. 12B is a top elevation of the support system showing the hub and three rails in a T-shaped configuration.
Figure 12C:
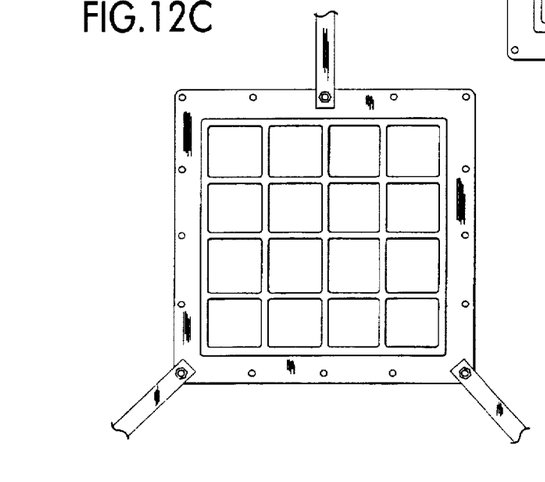
FIG. 12C is a top elevation of the support system showing the hub and three rails in a Y-shaped configuration.

FIG. 7 shows a plurality of rail sections 14 radiating out from the hub in different directions. The support system may include a hub 12 and four rail sections 14 each extending from a respective side of the rim 52 at about a 90° angle, two rail sections connected to the hub in an L-shaped formation, as shown in FIG. 12A, three rail sections connected to the hub in a T-shaped or Y-shaped configuration, as shown in FIGS. 12B and 12C, respectively, or various other combinations.

The hub 12 described above is capable of joining a plurality of different size rail sections 14 in virtually any configuration, thus eliminating the need for stocking multiple splice connectors. The pivotal connection increases the number of possible junction configurations and simplifies installation. The grid 58 on the hub member 50 allows cable 16 to be easily secured to the hub member regardless of the orientation of the cable crossing the hub.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A line support system comprising a plurality of rail sections having line-supporting rungs extending laterally outward from the rail sections, a hub having a horizontal peripheral rim around the hub, and a plurality of vertical holes in the rim at intervals spaced around the rim for connecting said rail sections to said hub in positions in which the rail sections extend laterally out from the hub.

2. A support system as set forth in claim 1 wherein each of said rail sections has a vertical hole therethrough, said system further comprising a connector extending vertically through said vertical hole in the hub for connecting the rail section to the hub.

3. A support system as set forth in claim 2 wherein said connector extends through the vertical hole in the hub and the vertical hole in the rail section for connecting the rail section to the hub.

4. A support system as set forth in claim 1 wherein each rail section has an upper rail portion and a lower rail portion, and wherein the rail sections are configured for supporting lines at an elevation generally the same as an upper surface of the hub.

5. A line support system as set forth in claim 4 wherein each of said rungs has an upwardly bent outer end.

6. A line support system as set forth in claim 4 wherein said hub comprises a relatively thin, flat horizontal hub member having a maximum thickness substantially less than the height of each of said rail sections, and wherein said peripheral rim comprises flange means extending horizontally outwardly from the hub member.

7. A line support system as set forth in claim 1 wherein said rim is generally rectangular, having four sides and four corners.

8. A line support system as set forth in claim 7 wherein said vertical holes include four holes, one hole located at each corner of said rim.

9. A line support system as set forth in claim 7 wherein said vertical holes include holes located at each corner of said rim and a plurality of holes located along each side of said rim.

10. A line support system as set forth in claim 1 wherein said vertical holes include a set of vertical holes for connecting two rail sections to said rim in an L-shaped formation.

11. A line support system as set forth in claim 1 wherein said vertical holes include a set of vertical holes for connecting three rail sections to said rim in a T-shaped formation.

12. A line support system as set forth in claim 1 wherein said vertical holes include a set of vertical holes for connecting three rail sections to said rim in a Y-shaped formation.

13. A line support system as set forth in claim 1 wherein said hub and rim are integrally formed from a single piece of sheet metal.

14. A line support system as set forth in claim 1 wherein said rim is generally rectangular, having four sides and four corners, and wherein said hub comprises a horizontal hub member and a plurality of ribs extending between at least two sides of the hub member.

15. A line support system as set forth in claim 14 wherein said hub member comprises a rectangular frame having four sides, said ribs forming a grid located within and connected to the four sides of said frame.

16. A line support system comprising
a plurality of rail sections having line-supporting rungs extending laterally outward from the rail sections, each rail section having a bottom surface and each rung having a line-supporting surface,
a hub having an upper surface and a horizontal peripheral rim around the hub, the peripheral rim comprising a flange structure extending horizontally outwardly from the hub, said flange structure being downwardly offset with respect to said upper surface of the hub a distance approximately equal to the distance from said bottom surface of the rail section to said line-supporting surface of said rung, and
a plurality of vertical holes in the rim at intervals spaced around the rim for connecting said rail sections to said hub in positions in which the rail sections extend laterally out from the hub.

17. A line support system comprising
a plurality of rail sections,
a hub having a horizontal peripheral rim around the hub, said rim being generally rectangular, having four sides and four corners, said hub comprising a horizontal hub member and a plurality of ribs extending between at least two sides of the hub member,
a plurality of vertical holes in the rim at intervals spaced around the rim for connecting said rail sections to said hub in positions in which the rail sections extend laterally out from the hub.

18. A line support system as set forth in claim 17 wherein said hub member comprises a rectangular frame having four sides, said ribs forming a grid located within and connected to the four sides of said frame.

19. A line support system comprising
a plurality of rail sections,
a hub having a horizontal peripheral rim around the hub, and a plurality of vertical holes in the rim at intervals spaced around the rim for connecting said rail sections to said hub in positions in which the rail sections extend laterally out from the hub, said vertical holes including a set of holes for connecting four rail sections to said rim, each rail section extending from a respective side of the rim at about a 90° angle relative to said side of the rim.

* * * * *

UNITED STATES PATENT AND TRADEMARK OFFICE
CERTIFICATE OF CORRECTION

PATENT NO. : 5,782,439
DATED : July 21, 1998
INVENTOR(S) : Eric R. Rinderer

It is certified that error appears in the above-identified patent and that said Letters Patent is hereby corrected as shown below:

Column 5, claim 6, line 19, "comprises flange means extending" should read ---comprises a flange structure extending---.

Signed and Sealed this

Twenty-second Day of September, 1998

Attest:

BRUCE LEHMAN

Attesting Officer

Commissioner of Patents and Trademarks